(12) United States Patent
McSchooler

(10) Patent No.: US 11,196,825 B2
(45) Date of Patent: Dec. 7, 2021

(54) SYSTEMS, METHODS AND APPARATUS FOR RESTRICTING NETWORK ACCESS

(71) Applicant: Dish Technologies L.L.C., Englewood, CO (US)

(72) Inventor: Jeffrey McSchooler, Parker, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 38 days.

(21) Appl. No.: 15/157,751

(22) Filed: May 18, 2016

(65) Prior Publication Data
US 2017/0339067 A1    Nov. 23, 2017

(51) Int. Cl.
*H04L 29/08* (2006.01)
*H04L 29/06* (2006.01)

(52) U.S. Cl.
CPC .............. *H04L 67/22* (2013.01); *H04L 63/10* (2013.01); *H04L 67/306* (2013.01)

(58) Field of Classification Search
CPC ..... H04L 47/808; H04L 67/22; H04L 67/306; H04L 63/10
USPC .......................................................... 709/225
See application file for complete search history.

(56) References Cited

U.S. PATENT DOCUMENTS

| | | | |
|---|---|---|---|
| 8,086,678 B2 | 12/2011 | Heredia et al. | |
| 8,468,578 B1 | 6/2013 | Lu et al. | |
| 8,832,264 B2 | 9/2014 | Pauley | |
| 8,914,494 B2 | 12/2014 | Bunch et al. | |
| 9,213,845 B1* | 12/2015 | Taraki | H04L 63/102 |
| 9,497,068 B1* | 11/2016 | Krishnamurthy | G06F 17/30 |
| 2005/0138359 A1* | 6/2005 | Simon | H04L 63/0823 713/156 |
| 2005/0198319 A1 | 9/2005 | Chan et al. | |
| 2006/0003796 A1* | 1/2006 | Vireday | H04W 12/08 455/550.1 |
| 2008/0183997 A1* | 7/2008 | Ballard | G06F 21/80 711/163 |
| 2009/0174551 A1 | 7/2009 | Quinn et al. | |
| 2010/0058446 A1* | 3/2010 | Thwaites | G06F 21/604 726/4 |

(Continued)

FOREIGN PATENT DOCUMENTS

WO   2011039548   4/2011

OTHER PUBLICATIONS

"Barracuda Web Filter", Barracuda, Sep. 2, 2015. http://www.barracuda.com/assets/docs/Datasheets/Barracuda_Web_Filter_DS_US.pdf.

(Continued)

*Primary Examiner* — Thomas J Dailey
(74) *Attorney, Agent, or Firm* — Perkins Coie LLP

(57) ABSTRACT

Various embodiments of systems, apparatus, and/or methods are described for restricting user devices from accessing a communication network. In one implementation, multiple user devices are assigned to a user profile. At least one access parameter is designated for the user profile. An access device monitors data usage, time usage, and content usage of each of the devices associated with the user profile. In some examples, the access device may consolidate the data usage and time usage of all of the devices. If one or more of the consolidated data usage, consolidated time usage, or content usage violates the access parameter of the user profile, the access device restricts at least one of the multiple user devices from accessing the communication network.

20 Claims, 8 Drawing Sheets

(56) References Cited

U.S. PATENT DOCUMENTS

| | | |
|---|---|---|
| 2011/0292938 A1 | 12/2011 | Harp et al. |
| 2012/0311673 A1* | 12/2012 | Sodah ................. G06F 21/6218 726/4 |
| 2014/0040973 A1* | 2/2014 | Bhat ....................... G06F 21/10 726/1 |
| 2015/0074259 A1 | 3/2015 | Ansari et al. |
| 2015/0095985 A1 | 4/2015 | Hua et al. |
| 2015/0156183 A1 | 6/2015 | Beyer et al. |
| 2015/0244725 A1 | 8/2015 | Ziskind et al. |
| 2016/0344873 A1* | 11/2016 | Jenzeh ................ H04M 15/866 |

OTHER PUBLICATIONS

"Skydog: Your Home Network Reinvented", Sky Power Systems, Sep. 1, 2015. http://www.kickstarter.com/projects/110098832/skydog-your-home-network-reinvented/description.

"Sophos Web Security Appliances", Sophos, Sep. 1, 2015. http://www.sophos.com/en-us/products/secure-web-gateway.aspx.

* cited by examiner

SYSTEMS, METHODS AND APPARATUS FOR RESTRICTING NETWORK ACCESS

BACKGROUND

Parents, schools and businesses may utilize content filtering technology that automatically identifies and filters (i.e., blocks) access to certain content. Filters can be implemented in many different ways, such as with software on a personal computer, or via network infrastructure such as routers, proxy servers, DNS servers, firewalls, or other devices that provide network access. Filters that are part of network infrastructure often subject all users connected to the network infrastructure to the same access policies. Whereas software-based filters on a personal computer may be customized, but must be installed on every device where filtering is desired.

SUMMARY

The present disclosure relates to systems, methods, and apparatus for controlling internet access. In one implementation, the method includes assigning a plurality of user devices to a user profile; designating at least one access parameter for the user profile; monitoring data usage, time usage, and content usage of each of the plurality of user devices; determining that one or more of the data usage, time usage, or content usage violate the at least one access parameter of the user profile; and restricting at least one of the plurality of user devices from accessing a communication network.

In some examples, the at least one access parameter includes one or more of a data usage limit, a time usage limit, a time usage range, and content categories. In some examples, the method further includes notifying an administrator device when at least one of the plurality of user devices is restricted from accessing the communication network. In some examples, the notification comprises one or more of a visual notification, an audio notification, and a tactile notification. In some examples, the notification comprises an indication of the at least one access parameter that was violated. In some examples, the method further includes receiving an instruction from the administrator device to allow the at least one of the plurality of user devices to continue accessing the communication network.

In some examples, the method further includes consolidating the data usage and time usage of the plurality of user devices. In some examples, consolidating the data usage comprises summing the total data used by the plurality of user devices. In some examples, consolidating the time usage comprises summing the total time the plurality of user devices have been used. In some examples, the content usage comprises one or more categories of content accessed by the plurality of user devices. In some examples, the method further includes designating two or more access parameters for the user profile; and determining that two or more of the data usage, time usage, or content usage violate two or more of the access parameters.

In one implementation, the access device includes a local area network (LAN) communication module in communication with a plurality of user devices; a wide area network (WAN) communication module in communication with an external network; at least one filter to selectively restrict communications between the plurality of user devices and the external network; a storage unit to store at least one user profile associated with the plurality of user devices and at least one access parameter for the at least one user profile; and a control logic to configure the at least one filter based on the user profile and the at least one access parameter, wherein the control logic monitors data usage, time usage, and content usage of each of the plurality of user devices and consolidates the data usage and time usage of the plurality of user devices, and wherein the at least one filter restricts at least one of the plurality of user devices from accessing the external network based on one or more of the consolidated data usage, consolidated time usage, or content usage violating the at least one access parameter.

In some examples, the control logic is configured to notify an administrator device when at least one of the plurality of user devices is restricted from accessing the communication network. In some examples, the control logic is configured to receive an instruction from the administrator device to allow the at least one of the plurality of user devices to continue accessing the communication network. In some examples, the control logic is configured to consolidate the data usage and time usage of the plurality of user devices. In some examples, the storage unit stores two or more access parameters for the user profile, and the at least one filter restricts at least one of the plurality of user devices from accessing the external network based on two or more of the data usage, time usage, or content usage violating two or more of the access parameters.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate access to one or more communication networks. More particularly, the various embodiments described herein provide for a parent or administrator to restrict one or more user devices from accessing particular content on a communication network.

Figure 1:
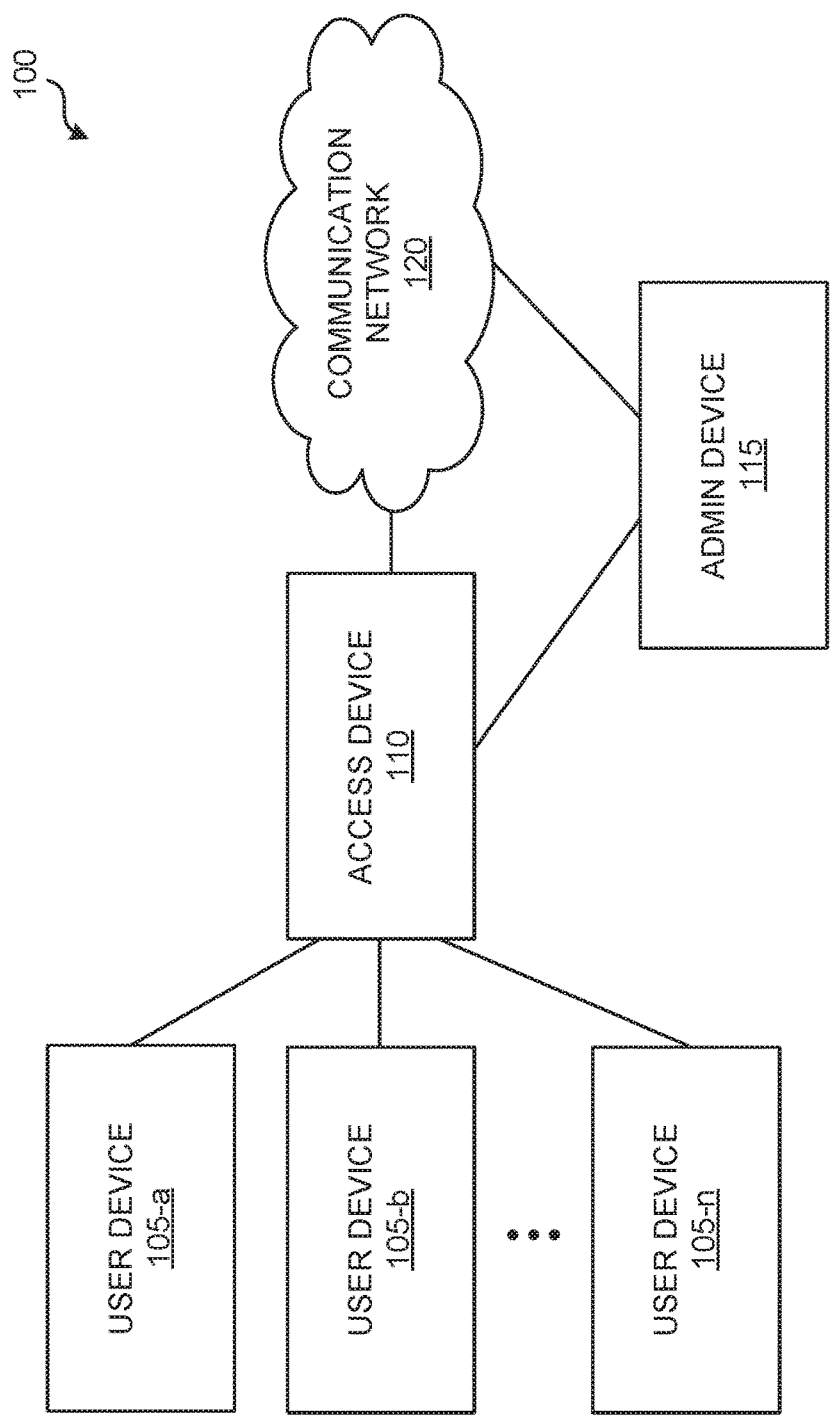
FIG. 1 illustrates an example of a communications system, in accordance with various aspects of the present disclosure.

FIG. 1 illustrates an example of a communications system 100, in accordance with various aspects of the present disclosure. In FIG. 1, a household or company may have multiple user devices 105a-105n. The user devices 105a-105n may be any hardware device that is capable of sending and receiving information over a communication network 120. Examples of user devices may include computers, mobile phones, PDAs, game consoles, televisions, set-top boxes, and the like. The communication network 120 may include one or more networks capable of connecting the user devices 105a-105n to entertainment content, informational content, and/or interactive content, such as the Internet, a cable distribution network, a satellite distribution network, a local area network, and the like.

An access device 110 provides the user devices 105a-105n with access to the communication network 120. The access device 110 may be a router (wired or wireless), an access point, a modem, or other device capable of providing multiple user devices with access to the communication network 120.

The access device 110 includes filters for restricting particular user devices from accessing particular content on the communication network 120. For example, the access device 110 may restrict one more user devices belonging to a child from accessing adult content. The access device 110 may also restrict particular user devices from accessing particular content during certain times or after certain durations of time. The access device 110 may also restrict particular user devices from accessing particular content based on the user devices based on the total data usage of the user devices. In some embodiments, the access device 110 restricts access based on the content accessed by multiple user devices belonging to (or assigned to) a user. The access device 110 may also restrict access based on a combination of conditions, such as accessing particular content during a certain time of day.

An admin device 115 configures the filters on the access device 110. The admin device 115 may be one or more of the user devices 105a-105n that belong or are assigned to a parent or administrator. Alternatively or in addition, the admin device 115 may be integrated into the access device 110, or may be software running on other computer or network devices. For example, a home router may include embedded software that allows it to operate as an admin device 115.

The admin device 115 has elevated privileges with the access device 110, which allows the admin device 115 to configure the filters for restricting access to other user devices 105a-105n. The admin device 115 may also receive notifications if one or more of the user devices 105a-105n trigger the access device 110 to restrict content and/or access to the communication network 120. The notifications may be sent from the access device 110 directly to the admin device 115, or the notifications may be sent via the communication network 120.

Figure 2:
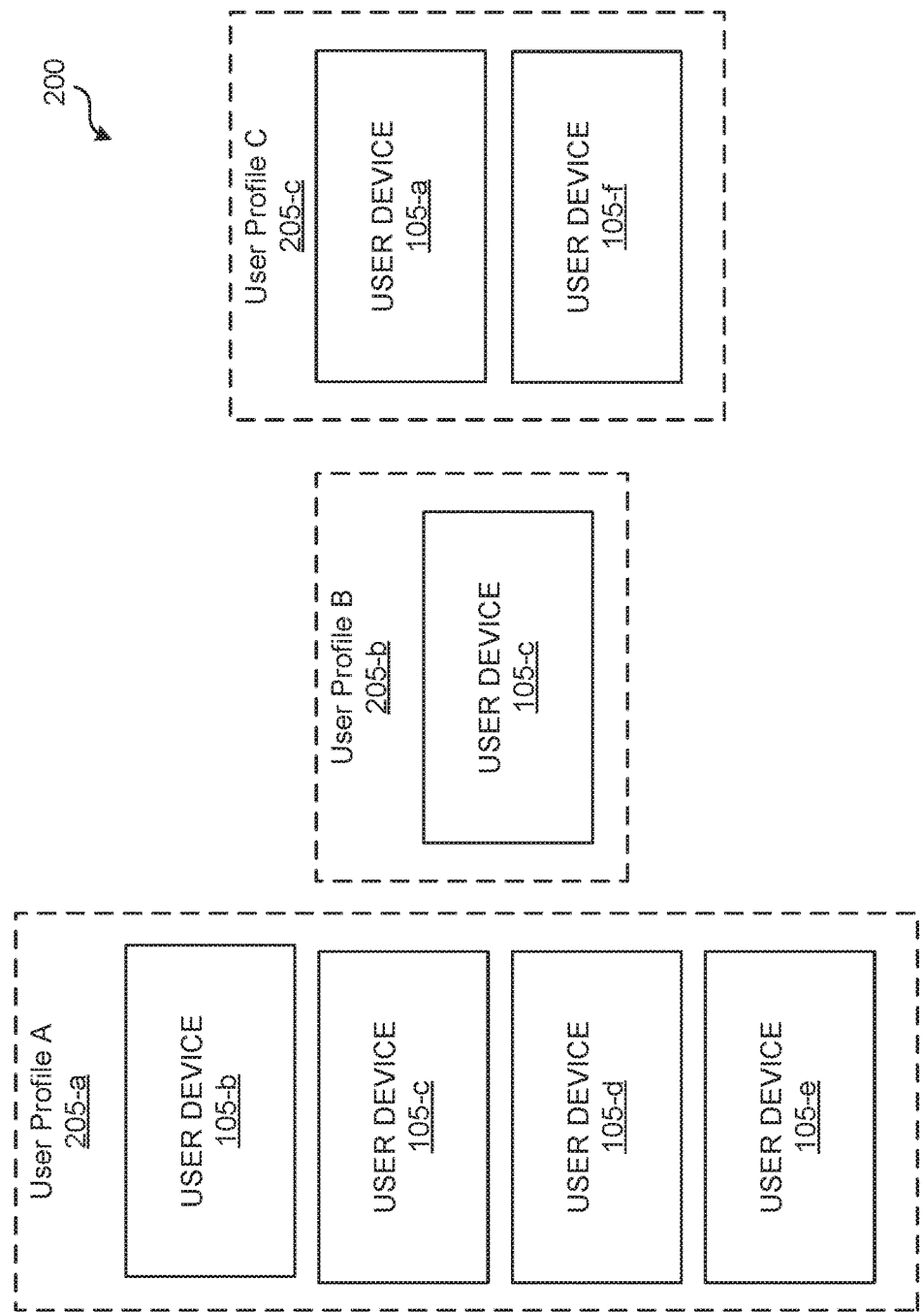
FIG. 2 illustrates an example of groupings of user devices, in accordance with various aspects of the present disclosure.

FIG. 2 illustrates an example of groupings 200 of user devices 105, in accordance with various aspects of the present disclosure. An administrator (or parent) may assign multiple user devices 105 to certain user profiles 205. Each user profile 205 may be associated with a particular user (such as a child, the administrator themselves, or a spouse). For example, a first user (such as an older child) may be associated with User Profile A 205a. The first user may regularly utilize four different user devices 105 to access the communication network 120. For example, user device 105b may be a personal computer, user device 105c may be a television, user device 105d may be a game console, and user device 105e may be a mobile phone. The administrator may assign each of the user devices 105b-105e to the User Profile A 205a associated with the first user. The access device 110 may then consolidate the time usage, data usage, and content usage across all of the devices utilized by the first user. Based on this consolidated usage, the access device 110 may restrict one or more of the user devices 105b-105e from accessing the communication network 120 and/or particular content on the communication network 120.

A second user (such as a younger child) may be associated with User Profile B 205b. The second user may only regularly utilize one user device 105c. The user device 105c may be, for example, a television. The administrator may assign the user device 105c to the User Profile B 205b associated with the second user. In this way, a user device 105 may be assigned to two different user profiles 205. The access device 110 may track the time usage, data usage, and content usage of the user device 105c separately for each user profile 205a and 205b.

The administrator (such as a parent) may be associated with User Profile C 205c. The User Profile C 205c may be designated as an administrator profile in the access device 110, which grants administrative privileges to the profile. The administrator may designate user device 105a and 105f as admin devices 115. User device 105a may be, for example, a mobile phone, and user device 105f may be, for example, a laptop computer. The administrator may utilize the user devices 105a or 105f to configure the access device 110, and to receive notifications from the access device 110. The administrator may also optionally set time usage, data usage, and/or content usage limits for the user device 105a and/or user device 105f.

The administrator may assign user devices 105 to user profiles 205 through an interface provided by the access device 110. For example, the access device 110 may present the administrator with a list of all user devices 105 connected to the access device 110. The administrator may then assign each user device 105 to one or more user profiles 205. In one embodiment, the administrator may create user profiles for each user accessing the communication network 120, and then assign each of the user devices 105 to the user profiles 205 by dragging and dropping each user device 105 to a user profile 205. The administrator may also assign each of the user devices 105 to the user profiles 205 by manually entering user device information into the user profiles 205.

Figure 3A:
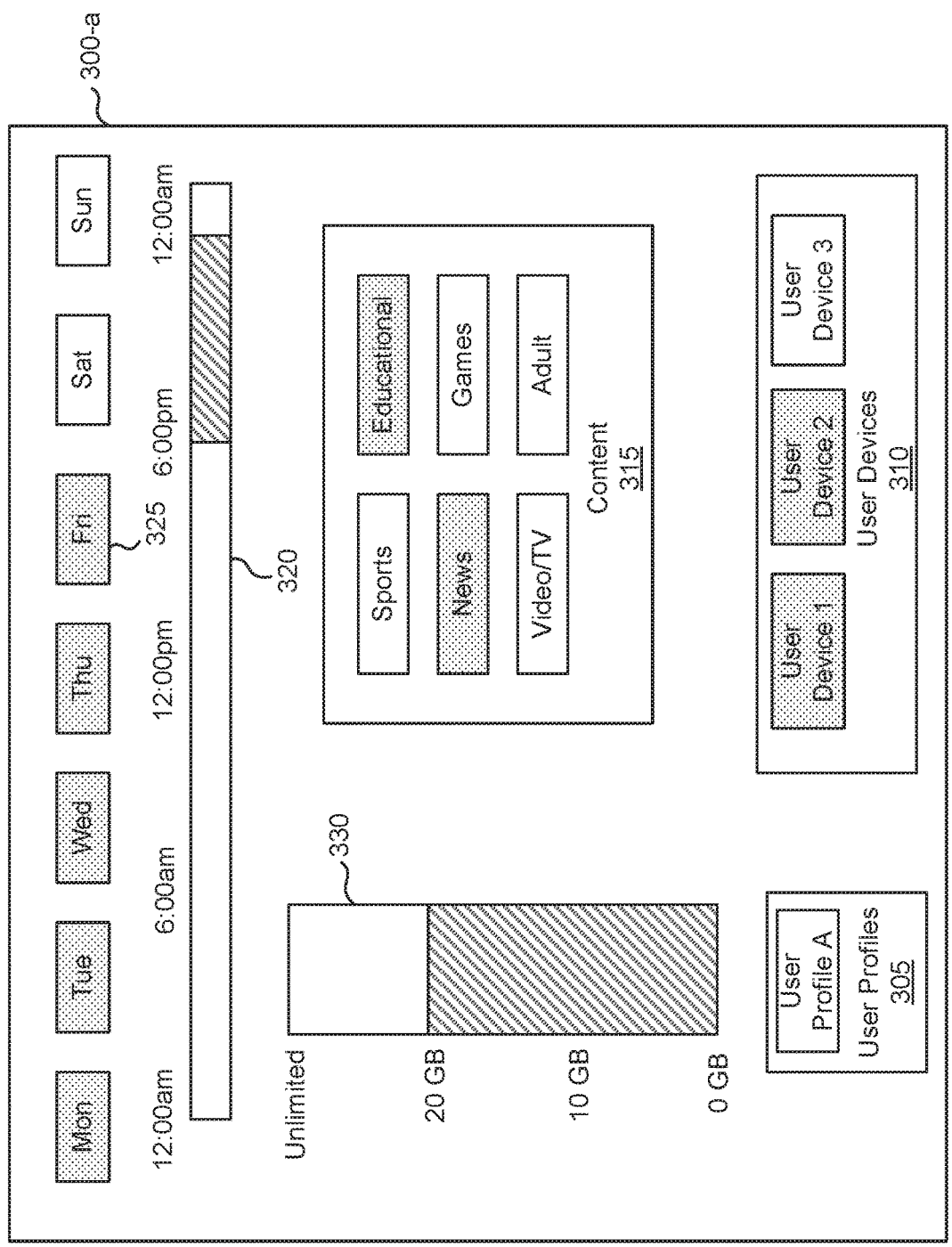
FIG. 3A is an example of a configuration interface for configuring access parameters for a user profile, in accordance with various aspects of the present disclosure.

FIG. 3A is an example of a configuration interface 300a for configuring access parameters for a user profile, in accordance with various aspects of the present disclosure. The configuration interface 300a may be transmitted from the access device 110 to an admin device 115, and displayed on the admin device 115. Alternatively, in some embodiments, the configuration interface 300a may be displayed directly by the access device 110.

The configuration interface 300a includes a user profile section 305 for selecting a user profile. For example, the administrator may select the user profile using a drop down menu. With a user profile is selected (such as User Profile A), the user devices assigned to the user profile are displayed in a user device section 310. If no user devices are assigned to the user profile, the administrator may be given an option to assign user devices to the user profile, as described in reference to FIG. 2. The administrator may then select particular user devices assigned to the user profile to configure their access parameters. For example, three User Devices 1, 2, and 3 may be assigned to User Profile A. The administrator may then select User Devices 1 and 2 to configure the access parameters for those two user devices.

The access parameters may include a content usage parameter 315, time and day usage parameters 320 and 325, and/or a data usage parameter 330. The content usage parameter 315 allow the administrator to select certain categories of content the selected user devices are permitted to access. For example, the administrator may select educational content and news content. Other categories of content may include sports content, gaming content (e.g. content associated with a video game console), video/TV content (e.g., streaming video websites, cable television, satellite television, etc.), and adult content. It should be noted that categories of content in addition to those listed may also be selected. Furthermore, the administrator may define custom categories of content for the content usage parameter 315. After certain categories of content are selected for the content usage parameter 315, the selected user devices may be restricted from accessing content that violates the content usage parameter 315.

The time usage parameter 320 and day usage parameter 325 allow the administrator to select particular days and times that the selected user devices are permitted to access the selected categories of content. For example, the administrator may select weekdays for the day usage parameter 325, and a time range between 6:00 pm and 10:00 pm for the time usage parameter 320. The selected user devices may then be restricted from accessing all categories of content outside of the selected days and time range. During the selected days and time range, the selected user devices may only be permitted to access the categories of content selected for the content usage parameter 315, as described above.

Alternatively or in addition to the time range shown in FIG. 3A, the time usage parameter 320 may include a time limit. The time limit may be set by the administrator to limit the total amount of time that the selected user devices are allowed to access the selected categories of content. For example, the administrator may set the time limit to two hours. Then the selected user devices may have a two hour limit for accessing the selected categories of content. The time limit may be set in combination with the day and time range. For example, the selected user devices may access the selected categories of content for a total of two hours between 6:00 pm and 10:00 pm on weekdays. The access device 110 may consolidate the amount of time each of the selected user devices spend accessing the selected categories of content. In this way, the time limit may represent the total amount of time that all of the selected user devices are allowed to access the content.

The data usage parameter 330 allows the administrator to limit the total amount of data that the selected user devices are permitted to use when accessing the selected content. For example, the administrator may set the data usage parameter 330 to 20 GB. After the selected user devices have consumed 20 GB of data, they may be restricted from accessing any additional content. The amount of data consumed may be consolidated across the selected user devices. In this way, the data usage parameter 330 may represent the total amount of data that all of the selected user devices are allowed to consume.

Figure 3B:
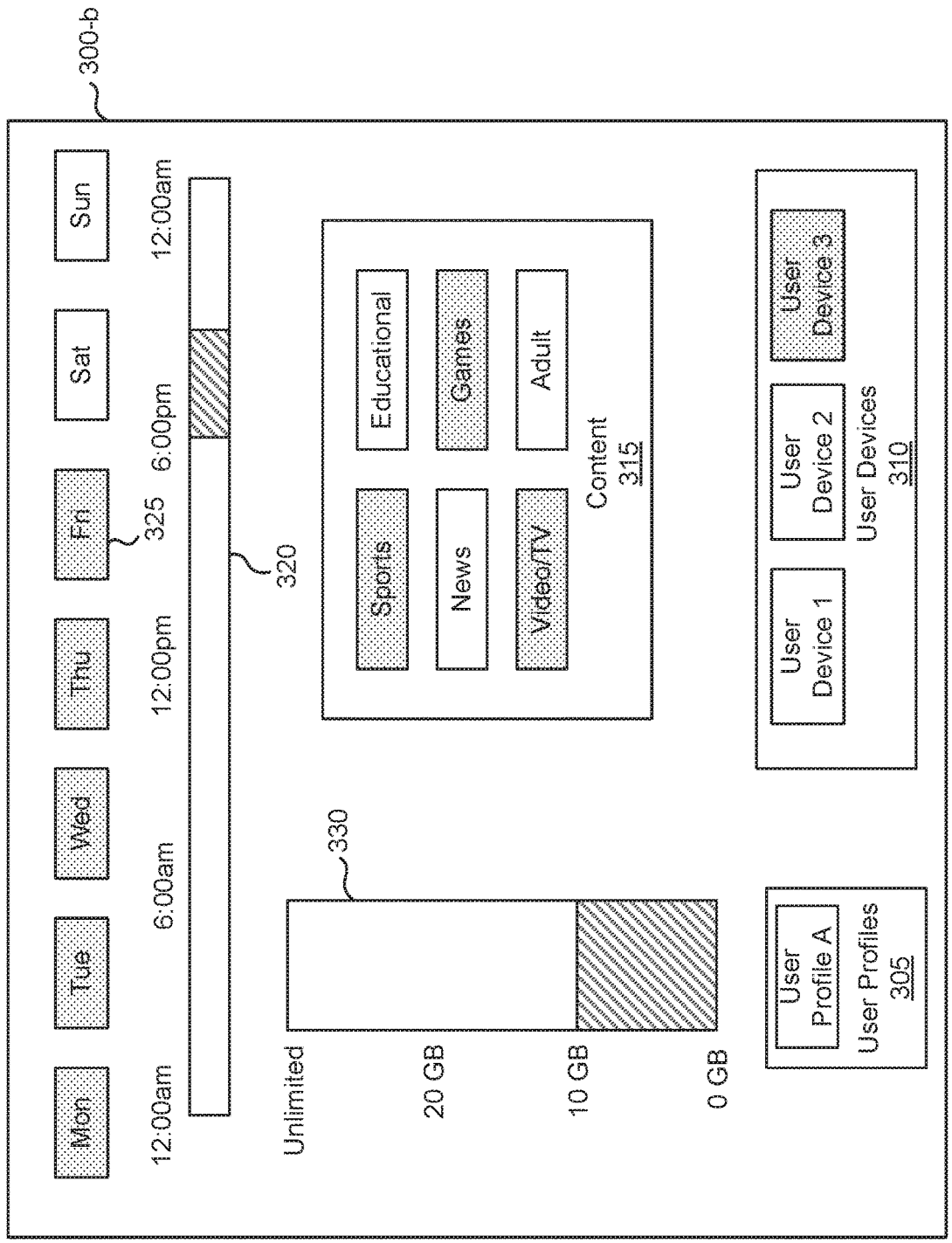
FIG. 3B is another example of a configuration interface for configuring access parameters for a user profile, in accordance with various aspects of the present disclosure.

FIG. 3B is another example of a configuration interface 300b for configuring access parameters for a user profile, in accordance with various aspects of the present disclosure. The configuration interface 300b is similar to the configuration 300a described in reference to FIG. 3A. However, in configuration interface 300b, the third User Device 3 assigned to User Profile A is selected in the user device section 310. In this way, different access parameters may be selected for User Device 3 as compared to User Devices 1 and 2, while they are all assigned to the same User Profile A.

As shown in FIG. 3B, the administrator may configure a different content usage parameter 315, time and day usage parameters 320 and 325, and data usage parameter 330 for the User Device 3. The content usage parameter 315 may be configured to allow sports content, gaming content, and video/TV content. The time usage parameters 320 may be configured to allow the User Device 3 to access the selected categories of content between 6:00 pm and 8:00 pm. The day usage parameter 325 may be configured to allow access to the selected content on weekdays. And the data usage parameter 330 may be configured to allow User Device 3 to use a maximum of 10 GB accessing the selected content 315.

Time spent accessing the selected categories of content by User Device 3 may not apply to a time limit set for User Devices 1 and 2. Similarly, time spent accessing the selected categories of content by User Devices 1 and 2 may not apply to a time limit set for User Device 3. In this way, different user devices may be given different time limits. The same may also apply to the data usage parameter 330. Data consumed by User Device 3 may not apply to the data usage parameter 330 of User Devices 1 and 2, and vice versa.

It should be noted that the the interfaces 300a and 300b shown in FIGS. 3A and 3B are examples. Other layouts and functionality may be included in the interfaces to allow an administrator to view or change the access parameters of the access device 110.

Figure 4:
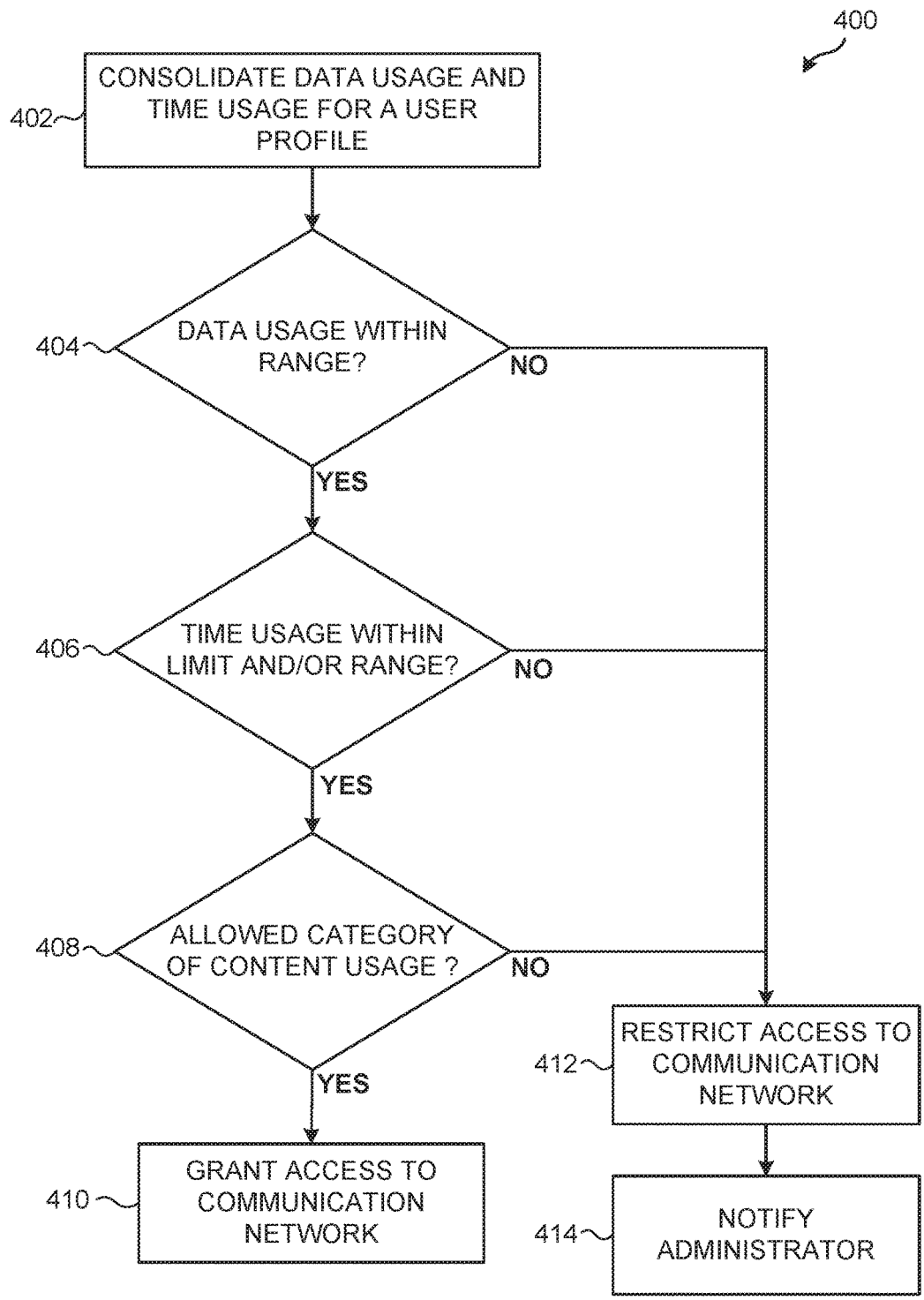
FIG. 4 is a flow diagram illustrating example operations of an access device, in accordance with various aspects of the present disclosure.

FIG. 4 is a flow diagram 400 illustrating example operations of an access device 110, in accordance with various aspects of the present disclosure. The operations of FIG. 4 are discussed in reference to the access device 110 described in reference to FIGS. 1-3. The operations of FIG. 4 are not all-inclusive, and may comprise additional operations described herein, and/or other operations not illustrated for the sake of brevity.

In one implementation, the access device 110 consolidates the data usage and time usage of multiple user devices associated with a user profile (operation 402). The access device then identifies whether the consolidated data usage falls within a data usage range defined by the data usage parameter (operation 404). If the user devices associated with the user profile have exceeded the data usage range, then the access device 110 may restrict one or more of the user devices from accessing the communication network (operation 412).

The access device 110 also identifies whether the consolidated time usage falls within a time usage limit and/or range defined by the time and day parameters (operation 406). The time usage limit may be a total duration the user devices have spent accessing content. The time usage range may be a start and end time within which the user devices are allowed to access the content. If the user devices associated with the user profile have exceeded (and/or are outside of) their allowed time usage, then the access device 110 may restrict one or more of the user devices from accessing the communication network (operation 412).

The access device 110 also identifies whether the content being accessed falls within the allowed categories of content defined by the content usage parameter (operation 408). If the user devices associated with the user profile have tried to access content outside of the allowed categories, then the access device may restrict one or more of the user devices from accessing the communication network (operation 412).

It should be noted that the operations 404, 406, and 408 may be carried out in any order.

If any of the operations 404, 406, or 408 cause access to the communication network to be restricted, then the administrator may be notified (operation 414). The notification may provide information about why the access was restricted, and which devices and/or user profiles have been restricted.

If none of the operations 404, 406, or 408 cause access to the communication network to be restricted, then the user devices may continue to access the communication network (operation 410), in accordance with the access parameters.

Figure 5:
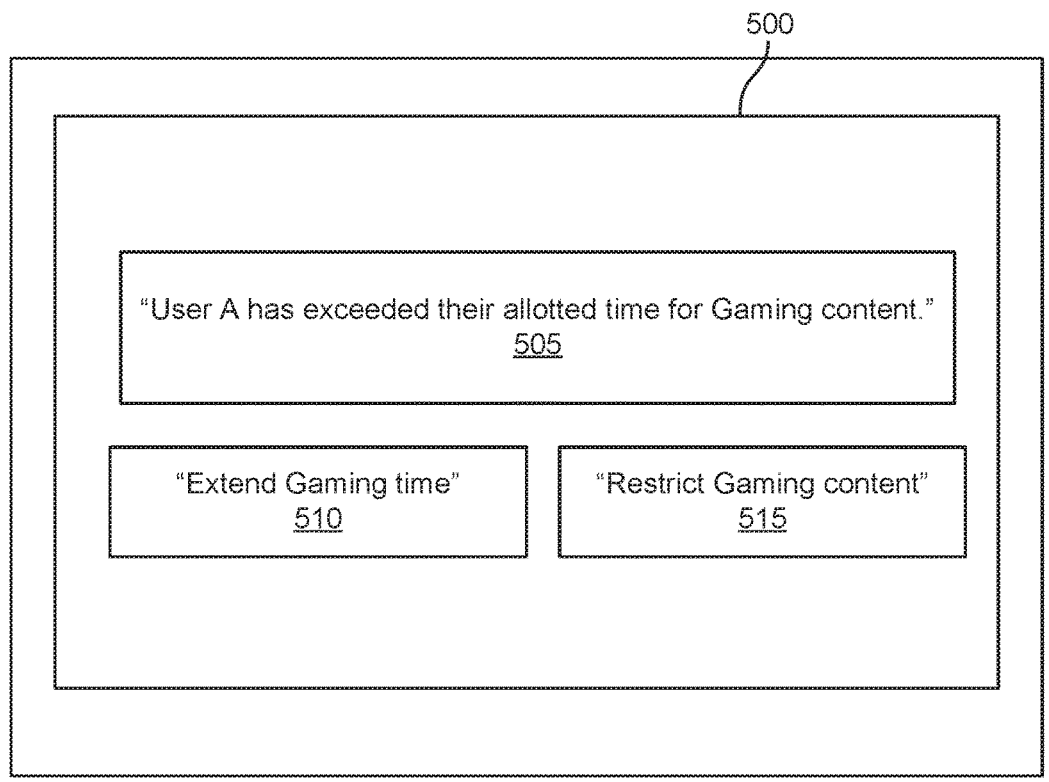
FIG. 5 illustrates an example of a display presenting a notification interface to an administrator, in accordance with various aspects of the present disclosure.

FIG. 5 illustrates an example of a display presenting a notification interface 500 to an administrator, in accordance with various aspects of the present disclosure. The notification interface 500 may include information 505 about why a user device and/or user profile has been restricted from accessing the communication network. For example, notification interface 500 may inform the administrator that "User A has exceeded the time limit for Gaming content." The notification interface 500 may provide the administrator with options 510 and 515 to either allow the user profile to continue accessing the communication network (option 510) or to confirm that access should be restricted (option 515). For example, the administrator may be provided with an option to "Extend Gaming time" and an option to "Restrict Gaming content."

The notification interface 500 may also present other information to the administrator. For example, the administrator may view the current status of user devices connected to the access device 110. The status may include the current content being accessed, the total time spent accessing the content, and the current amount of data that has been consumed. The administrator may also view or change the access parameters, as described in reference to FIGS. 3A and 3B.

In addition or alternatively to the displayed notification interface 500, the access device may provide the administrator with an audio notification and/or a tactile notification. The audio notification may include an alarm or a spoken message associated with the user device and/or user profile being restricted from accessing the communication network. The tactile notification may include a vibration or pattern of vibrations associated with the user device and/or user profile being restricted from accessing the communication network.

Figure 6:
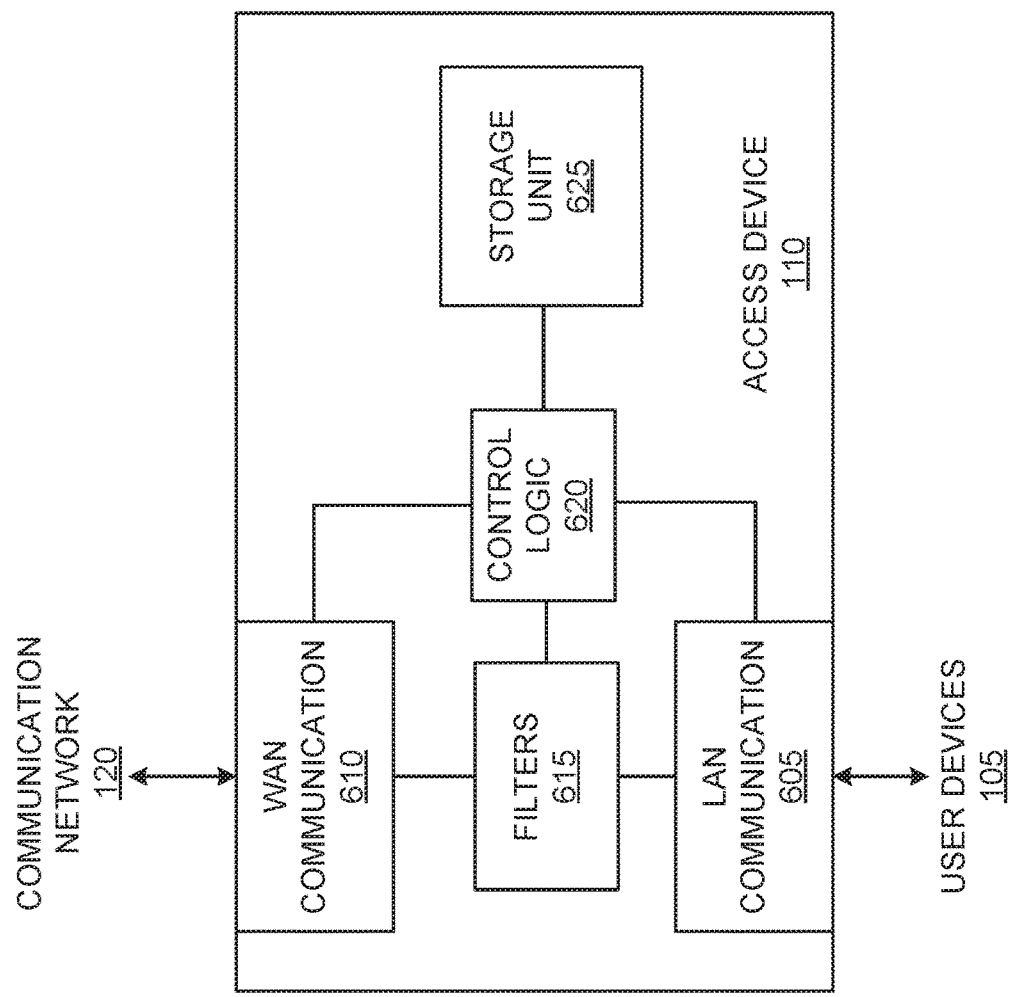
FIG. 6 illustrates an example of an access device, in accordance with various aspects of the present disclosure.

FIG. 6 illustrates an example of an access device 110, in accordance with various aspects of the present disclosure. The access device 110 may be an example of the access devices described in reference to FIGS. 1-5. The access device 110 includes a local area network (LAN) communication module 605 and a wide area network (WAN) communication module 610. The LAN communication module 605 connects to the user devices 105 and allows the user devices to communicate with one another. The WAN communication module 610 connects to the external communication network 120.

The access device 110 allows the user devices to access the external communication network 120 by routing communications from the LAN communication module 605 to the WAN communication module 610. Some of the communications from the user devices 105 may be restricted by filters 615 based on how the access device is configured, as described in reference to FIGS. 3A and 3B. For example, certain user devices 105 may only be allowed to access the communication network 120 at certain times of day, so the filters may block communications from those user devices when they try to communicate outside of the allowed time range.

The filters 615 and communications between the LAN communication module 605 and WAN communication module 610 may be controlled or configured by a control logic 620. The control logic 620 may utilize access parameters stored in a storage unit 625 to configure the filters 615. The access parameters may include a data usage parameter, time and day usage parameters, and a content usage parameter. The storage unit 625 may also store user profile information. The user profile information may link particular user devices connected to the access device 110 with certain users or administrators. Each user profile may be associated with a different set of access parameters.

Figure 7:
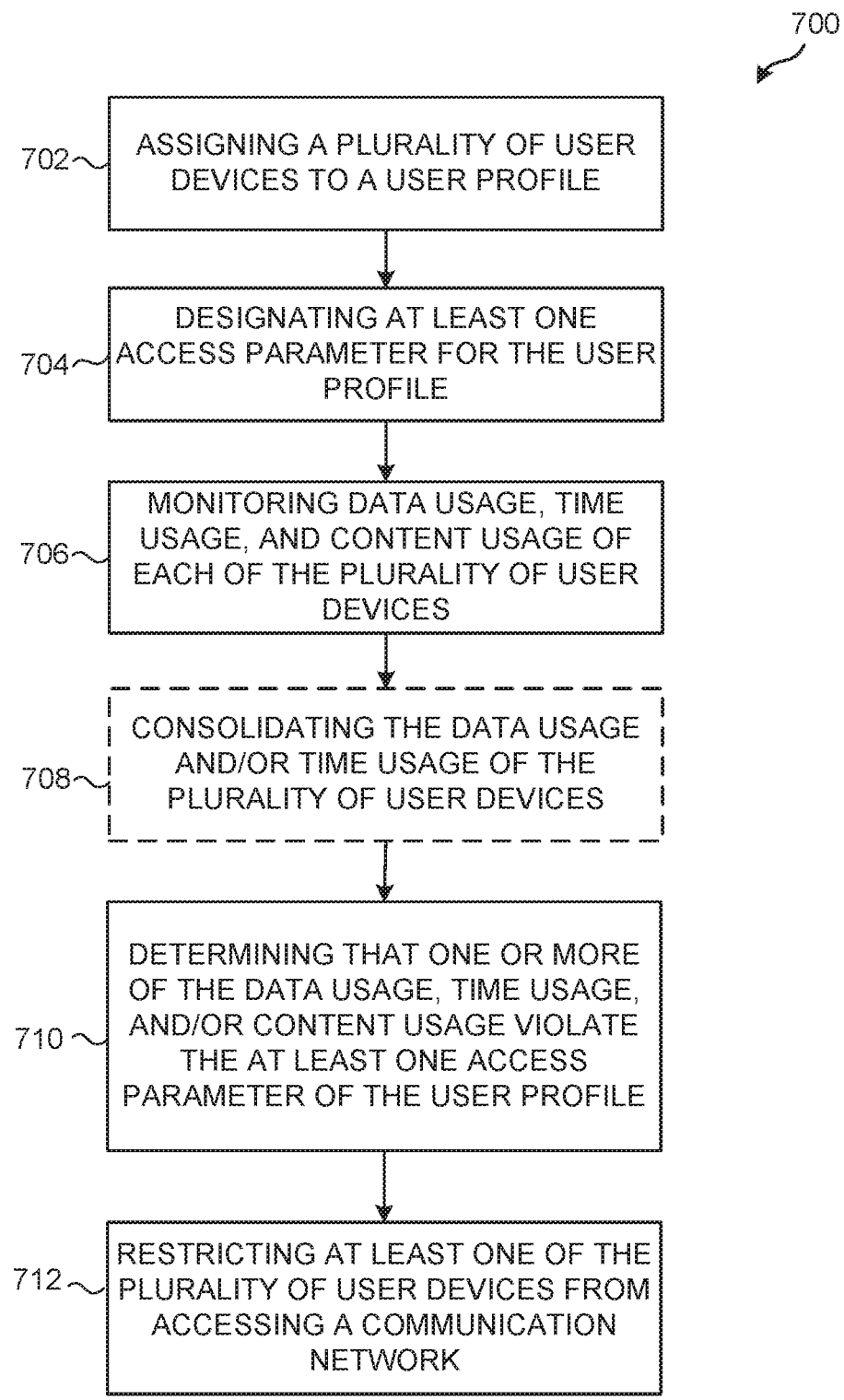
FIG. 7 is a flow diagram illustrating an example of a process for restricting access to a communication network, in accordance with various aspects of the present disclosure.

FIG. 7 is a flow diagram illustrating an example of a process 700 for restricting access to a communication network, in accordance with various aspects of the present disclosure. The process may be performed by an access device 110, as described in reference to FIGS. 1-6.

At 702, a plurality of user devices are assigned to a user profile. The user devices may correspond to devices that are connected to the access device, and the user profile may correspond to a particular user that owns or utilizes the assigned user devices. An administrator may assign the user devices to a user profile by, for example, dragging and dropping each user device into a user profile on an interface provided by the access device.

At 704, at least one access parameter is designated for the user profile. The access parameter may include a data usage parameter, a time usage parameter, a day usage parameter, and a content usage parameter. The content usage parameter may define particular categories of content that the user devices assigned to the user profile are allowed to access. The time usage parameter may define a time range and/or a time limit for accessing the categories of content and/or a communication network. The day usage parameter may define particular days of the week for accessing the categories of content and/or the communication network. The data usage parameter may define a data usage limit for the user profile to access the categories of content and/or the communication network.

At 706, the data usage, time usage, and content usage of each of the plurality of user devices are monitored by the access device.

At 708, the data usage and/or time usage of the plurality of user devices may optionally be consolidated by the access device. The access device may consolidate the data usage by summing the total data used by the plurality of user devices while accessing particular content and/or the communication network. The access device may consolidate the time usage by summing the total time the plurality of user devices have spent accessing particular content and/or the communication network.

At 710, the access device determines that one or more of the data usage, time usage, and/or content usage violate the at least one access parameter designated for the user profile. In some examples, the data usage and/or time usage may be the consolidated across all user devices assigned to a user profile. For example, the data usage may violate a data usage parameter by exceeding a data usage limit. The time usage may violate a time usage parameter by exceeding a time usage limit. The content usage may violate a content usage parameter by attempting to access content that is outside of certain categories of content.

At 712, the access device restricts at least one of the plurality of user devices from accessing a communication network. Alternatively, the user device may be restricted from accessing particular content on the communication network. For example, the user may be restricted from accessing gaming content if one or more access parameters are violated.

In some embodiments, the access device may also notify an administrator device when at least one of the plurality of user devices is restricted from accessing the communication network and/or particular content. The notification may include a visual notification, an audio notification, and/or a tactile notification. The notification may indicate the access parameter that was violated. The access device may also receive an instruction from the administrator device to allow the restricted user device to continue accessing the communication network.

The process 700 may include additional acts, omit some acts, and/or may perform the acts in a different order than set out in the FIG. 7.

Although specific embodiments were described herein, the scope of the invention is not limited to those specific embodiments. The scope of the invention is defined by the following claims and any equivalents therein.

What is claimed is:

1. A method, comprising:
    assigning a plurality of user devices to a user profile, wherein the user profile is representative of a user;
    assigning one of the plurality of user devices to a second user profile that is different from the user profile;
    selecting a first category of content to which a first user device of the plurality of user devices has permission to access, the first category of content being assigned to a first content usage parameter;
    designating a plurality of access parameters for the user profile, wherein the designating includes designating a first access parameter to the first user device and a second access parameter to a second user device of the plurality of user devices, the second access parameter being different from the first access parameter;
    selecting a different access parameter for a third user device of the plurality of user devices as compared to the first access parameter to the first user device and the second access parameter to the second user device, wherein the third access parameter comprises: a content usage parameter, a time usage parameter, or a data usage parameter;
    monitoring, by an access device that provides access to a communication network, data usage, time usage, and selected categories of content usage of each of the plurality of user devices of the communication network for the user profile, wherein monitoring the content usage of the first user device comprises using the first content usage parameter to identify whether content trying to be accessed falls within the first category;
    monitoring, separately, data usage, time usage, and content usage of the user device also assigned to the second user profile for the second user profile;
    determining, by the access device, that one or more of the data usage, time usage, or content usage violate the at least one access parameter of the user profile and that content outside of the first category was attempted to be accessed by the first device, independent of the data usage, time usage, or content usage monitored for the second user profile and independent of the data usage, time usage, or content usage monitored for the third user device;
    monitoring, by the access device, time usage for the selected categories of content across two or more devices of the plurality of user devices in the user profile, consolidating the monitored time usage for the selected categories, and determining that the consolidated time usage exceeds a total time limit, independent of the time usage for the selected categories of content of the third device; and
    restricting, by the access device, at least one of the two or more devices of the plurality of user devices from accessing the communication network when the consolidated time usage exceeds the total time limit.

2. The method of claim 1, wherein the at least one access parameter comprises one or more of a data usage limit, a time usage limit, a time usage range, and content categories.

3. The method of claim 1, further comprising:
    notifying an administrator device when at least one of the plurality of user devices is restricted from accessing the communication network.

4. The method of claim 3, wherein the notification comprises an indication of the at least one access parameter that was violated.

5. The method of claim 3, further comprising:
    receiving an instruction from the administrator device to allow the at least one of the plurality of user devices to continue accessing the communication network.

6. The method of claim 1, further comprising:
    consolidating the data usage and time usage of the plurality of user devices.

7. The method of claim 6, wherein consolidating the data usage comprises summing the total data used by the plurality of user devices.

8. The method of claim 6, wherein consolidating the time usage comprises summing the total time the plurality of user devices have been used.

9. The method of claim 1, wherein the content usage comprises one or more categories of content accessed by the plurality of user devices.

10. The method of claim 1, further comprising:
    designating two or more access parameters for the user profile; and
    determining that two or more of the data usage, time usage, or content usage violate two or more of the access parameters.

11. An access device, comprising:
    a local area network (LAN) communication module in communication with a plurality of user devices;
    a wide area network (WAN) communication module in communication with an external network;
    at least one filter to selectively restrict communications between the plurality of user devices and the external network;
    a storage unit to store at least one user profile associated with the plurality of user devices and at least one access parameter for the at least one user profile, wherein the user profile is representative of a user, the storage unit further configured to store a first access parameter for a first user device of the plurality of user devices and a second access parameter for a second user device of the plurality of user devices, the second access parameter being different from the first access parameter, a third access parameter for a third user device of the plurality of user devices, the third access parameter being different from each of the first and second access parameters, and the storage unit further configured to store a first content usage parameter corresponding to a selected first category of content to which the first user device has permission to access; and a control logic to configure the at least one filter based on the user profile and the at least one access parameter and the first content usage parameter, wherein the control logic monitors data usage, time usage, content usage and selected categories of content usage of each of the plurality of user devices, wherein one of the plurality of user devices is associated with a second user profile that is different from the at least one user profile, wherein the monitored data usage, time usage, and content usage of the user device that is also associated with the second user profile is monitored independently of the data usage, time usage, or content usage for the second user profile, and wherein the control logic monitors the content usage of the first user device, independent of content usage of the third device, by using the first content usage parameter to identify whether content trying to be accessed falls within the first category, wherein the control logic monitors, independent of the third device, time usage for the selected categories of content across two or more devices of the plurality of user devices in the user profile, consolidating the monitored time usage for the selected categories, and determining that the consolidated time usage exceeds a total time limit, independent of time usage of the third device; and wherein the at least one filter restricts, independent of the data from the third device, at least one of the plurality of remaining user devices from accessing the external network based on when the consolidated time usage exceeds the total time limit or on one or more of the data usage, time usage, or content usage violating the at least one access parameter or based on content outside of the first category being attempted to be accessed by the first device.

12. The access device of claim 11, wherein the at least one access parameter comprises one or more of a data usage limit, a time usage limit, a time usage range, and content categories.

13. The access device of claim 11, wherein the control logic is configured to notify an administrator device when at least one of the plurality of user devices is restricted from accessing the communication network.

14. The access device of claim 13, wherein the notification comprises an indication of the at least one access parameter that was violated.

15. The access device of claim 13, wherein the control logic is configured to receive an instruction from the administrator device to allow the at least one of the plurality of user devices to continue accessing the communication network.

16. The access device of claim 11, wherein the control logic is further configured to consolidate the data usage and time usage of the plurality of user devices.

17. The access device of claim 16, wherein consolidating the data usage comprises summing the total data used by the plurality of user devices.

18. The access device of claim 16, wherein consolidating the time usage comprises summing the total time the plurality of user devices have been used.

19. The access device of claim 11, wherein the content usage comprises one or more categories of content accessed by the plurality of user devices.

20. The access device of claim 11, wherein the storage unit stores two or more access parameters for the user profile, and wherein the at least one filter restricts at least one of the plurality of user devices from accessing the external network based on two or more of the 4 data usage, time usage, or content usage violating two or more of the access parameters.

* * * * *